US011911773B2

(12) United States Patent
Eisner et al.

(10) Patent No.: US 11,911,773 B2
(45) Date of Patent: Feb. 27, 2024

(54) APPARATUS AND METHOD FOR ATTACHING A CRUSHING MANTLE OF A CONE CRUSHER TO A CARRIER CONE OF THE CONE CRUSHER AND FOR DETACHING THE CRUSHING MANTLE FROM THE CARRIER CONE

(71) Applicant: Kleemann GmbH, Göppingen (DE)

(72) Inventors: Alan Eisner, Mequon, WI (US); Lucas Scholz, Waldstetten (DE)

(73) Assignee: Kleemann GmbH (DE)

( * ) Notice: Subject to any disclaimer, the term of this patent is extended or adjusted under 35 U.S.C. 154(b) by 0 days.

(21) Appl. No.: 17/867,849

(22) Filed: Jul. 19, 2022

(65) Prior Publication Data

US 2024/0024883 A1 Jan. 25, 2024

(51) Int. Cl.
*B02C 2/04* (2006.01)
*B02C 2/00* (2006.01)

(52) U.S. Cl.
CPC .............. *B02C 2/047* (2013.01); *B02C 2/005* (2013.01); *B02C 2210/02* (2013.01)

(58) Field of Classification Search
CPC ................................ B02C 2/047; B02C 2/005
See application file for complete search history.

(56) References Cited

U.S. PATENT DOCUMENTS

2011/0309176 A1* 12/2011 Kuvaja ..................... B02C 2/04 241/207
2019/0134640 A1* 5/2019 Hopping ................... B02C 2/00
2022/0371021 A1* 11/2022 Murphy .................... B02C 2/04

FOREIGN PATENT DOCUMENTS

AU 2015243563 B2 10/2016
DE 1283654 B1 11/1968
(Continued)

OTHER PUBLICATIONS

Co-pending related U.S. Appl. No. 17/867,866, filed Jul. 19, 2022 (not prior art).

*Primary Examiner* — Matthew Katcoff
*Assistant Examiner* — Mohammed S. Alawadi
(74) *Attorney, Agent, or Firm* — Lucian Wayne Beavers; Patterson Intellectual Property Law, PC

(57) ABSTRACT

An apparatus (2) and a method for attaching a cone-shaped crushing mantle (4) of a cone crusher (100) to a carrier cone (6) of the cone crusher (100) and for detaching the crushing mantle (4) from the carrier cone (6) are provided. The apparatus (2) comprises a hydraulically actuated pre-tensioning actuator (24) adapted for pressing the crushing mantle (4) against the carrier cone (6) in a pre-tensioning process in the axial direction prior to tightening attachment screws (18) in the head region (20) of the carrier cone (6). The hydraulic pre-tensioning actuator (24) comprises a pressure chamber (26) for receiving a pressurized hydraulic medium and a piston (28) limiting the pressure chamber (26). The hydraulic pre-tensioning actuator (24) is applied externally to a pressure plate (10) during the pre-tensioning process, such that a piston rod (36) of the piston (28) or a rod-shaped element attached thereto extends through the central opening (14) of the pressure plate (10) and is attached to the head region (20) of the carrier cone (6), wherein the pressure chamber (26) and the piston (28) of the hydraulic pre-tensioning actuator (24) are located on a side of the pressure plate (10) opposite to the carrier cone (6). The hydraulic pre-tensioning actuator (24) may be released and removed from the pressure plate (10) outside the pre-tensioning process.

19 Claims, 5 Drawing Sheets

(56) References Cited

FOREIGN PATENT DOCUMENTS

| | | | |
|---|---|---|---|
| WO | 2010086488 | A1 | 8/2010 |
| WO | 2011029133 | A1 | 3/2011 |
| WO | 2012171778 | A2 | 12/2012 |
| WO | 2014064329 | A1 | 5/2014 |
| WO | 2015139897 | A1 | 9/2015 |
| WO | 2015155205 | A1 | 10/2015 |
| WO | 2016169622 | A1 | 10/2016 |
| WO | 2020043891 | A1 | 3/2020 |
| WO | 2020073077 | A1 | 4/2020 |

* cited by examiner

APPARATUS AND METHOD FOR ATTACHING A CRUSHING MANTLE OF A CONE CRUSHER TO A CARRIER CONE OF THE CONE CRUSHER AND FOR DETACHING THE CRUSHING MANTLE FROM THE CARRIER CONE

BACKGROUND OF THE DISCLOSURE

Field of the Disclosure

The present invention refers to an apparatus for attaching a cone-shaped crushing mantle of a cone crusher to a carrier cone of the cone crusher and for detaching the crushing mantle from the carrier cone, the carrier cone having a carrier cone axis.

Description of the Prior Art

A cone crusher is a compression type of machine that reduces the size of fed material by squeezing or compressing between a moving piece (crushing mantle or inner crushing blade) usually made of steel and a stationary piece (crushing ring or outer crushing blade) usually made of steel. The fed material is in particular a mineral material like stone, rock, concrete or the like. A cone crusher will usually deliver a 4:1 to 6:1 reduction ratio, although other reduction ratios are available, too. As the closed side setting is set tighter to create a finer output, the volume or throughput capacity of the machine is also reduced.

The material fed into a cone crusher is crushed between a fixed crushing ring (in other words an outer crushing blade) of an upper part of the crusher's housing (or frame) and a crushing mantle (in other words an inner crushing blade), which rests on a conical seat near the bottom of a carrier cone (in other words a supporting cone or a cone head). The crushing mantle is attached to the carrier cone by an appropriate fastening device. Due to the very large forces that occur during the crushing process, the fastening device has to provide for a strong attachment of the crushing mantle to the carrier cone. At the same time the attachment should be torque proof, i.e. the crushing mantle is held from turning with respect to the carrier cone.

During operation of the cone crusher, the crushing mantle moves eccentrically in respect to the fixed crushing ring. The carrier cone is set into a tumbling or oscillating motion by a driving mechanism of the cone crusher. The dimensions of a crushing gap (or chamber) between the fixed crushing ring and the rotating crushing mantle in a certain point along the circumferential direction change continuously. In the crushing chamber, the material to be crushed is crushed by squeezing and compressing until it can leave the cone crusher as crushed material through the crushing gap. With other words, the carrier cone with the crushing mantle is entrained in an oscillating or gyrating motion about a rotational axis, wherein the crushing gap between the crushing mantle and the outer crushing ring varies at each point during the cycle.

The smallest crusher gap occurring during the cycle is called the closed side setting (CSS) of the cone crusher, and the difference between the maximum and the minimum of the gap is called the stroke of the crusher. By the crusher setting and the crusher stroke, as well as the operating speed of the crusher, it is possible, among other things, to influence the grain size distribution of the crushed material and the production capacity of the crusher.

The outer crushing ring as well as the inner crushing mantle are used as wearing parts during operation of the cone crusher and, therefore, have to be replaced from time to time. To this end, the fastening device must provide for a safe, easy and quick attachment of the crushing mantle to the carrier cone and detachment of the crushing mantle from the carrier cone. Various types of fastening devices are known in the state of the art.

For example, WO 2015/155 205 A1 (AU 2015243593 B2) discloses a cone carrier head (12) of a carrier cone (4) which is equipped with two external threads (25, 26) of different diameters. A manually actuated attachment nut (16) applies an axial attachment force to the crushing mantle (3) via a pressure ring (11) pressing it against the carrier cone (4). The attachment nut (16) uses the lower thread (25) on the cone carrier head (12) with the larger diameter. A commercially available hydraulically actuated tensioning nut (15) is screwed onto the upper thread (26) of the cone carrier head (12). Hydraulically actuating the tensioning nut (15) makes the nut exert, indirectly through a pressure sleeve (24) and the pressure ring (11), an axial clamping force on the crushing mantle (3) further pressing it against the carrier cone (4). The pressure sleeve (24) surrounds the attachment nut (16). The pressure sleeve (24) is provided with circumferentially extending cut-out passages through which actuating rods (18) for manually actuating the attachment nut (16) can be put through. The cut-out passages have a circumferential extension in order to allow tightening or loosening of the attachment nut (16), when the hydraulically actuated tensioning nut (15) is loaded. By tightening the attachment nut (16) on the external thread (25), the crushing mantle (3) is attached to the carrier cone (4). After relieving and removing the tensioning nut (15), a protective cap (22) is fitted to protect the fastening device.

The disadvantage of the fastening device disclosed in this reference is that the pressure sleeve (24) overlaps the attachment nut (16) radially and tightening and loosening of the attachment nut (16) can only be achieved by a small angle by means of the actuating rods (18) stuck through the cut-out passages in the pressure sleeve (24). With other words, the length of the cut-out passages in the circumferential direction limits a tightening and loosening movement of the attachment nut (16).

Reference WO 2012/171 778 A2 (US 2014110514) discloses a fastening device for removably attaching a crushing mantle to a conical seat of a carrier cone. The fastening device is adapted to tighten itself during operation of the cone crusher, similar to a clamping screw in angular grinders. Screws (36, 136, 232, 332) are provided for loosening the clamping connection between the crushing mantle and the carrier cone tightened during operation. The screws can be loosened individually to relieve the clamping connection. No hydraulic device for pre-tensioning the crushing mantle in respect to the carrier cone is provided in this reference. The final attachment force develops only gradually during operation of the cone crusher. The tightened clamping connection can only be released by loosening the screws (36, 136, 232, 332).

Reference WO 2020/073 077 A1 (US 2021322995) discloses a fastening device comprising a hydraulic tensioning nut (115) which is screwed onto an external thread (130) of a carrier cone. The tensioning nut (115) presses the crushing mantle (110) downwards onto the carrier cone. Lock screws (335) are screwed into the top of the hydraulic tensioning nut (115) and maintain the attachment force after the hydraulic pressure is reduced/released. The disadvantage of the fastening device disclosed in this reference is that the components of the entire hydraulic tensioning nut (115) remain in the cone carrier head during operation.

Reference DE 1 283 654 discloses a fastening device where an external thread (5) is provided on a cone carrier head (1, 3). A sleeve (4) is screwed onto the external thread (5), which comprises another external thread on its outer circumference and contains a hydraulic tensioning device (8, 9) at its lower end. The sleeve (4) is screwed on the external thread (5), hydraulic pressure is built up and thus the crushing mantle (2) is pressed onto the carrier cone (1). Then an attachment nut (6) is screwed onto the other external thread of the sleeve (4), the underside of which presses, indirectly by means of an intermediate ring (7), on the crushing mantle (2). This allows the hydraulic pressure exerted by the sleeve (4) or its hydraulic tensioning device (8, 9) to be relieved while the attachment nut (6) provides the clamping pressure for attachment of the crushing mantle (2) to the carrier cone (1). Again, the disadvantage of the fastening device disclosed in this reference is that the entire hydraulic tensioning device (8, 9) remains in the cone carrier head during operation.

Reference WO 2010/086 488 A1 (U.S. Pat. No. 8,944,356) starts from the prior art known from the previously cited reference, DE 1 283 654. It discloses an anti-rotation device of a hydraulic tensioning device (13, 18, 19, 20, 21, 24). Screws (14) connect a pressure plate (12) to a carrier cone (4). A first part (11) containing essential components (18, 19, 20, 21) of the hydraulic tensioning device is screwed into an internal thread (15) in the carrier cone (4) or its cone carrier head, respectively. A hydraulic pump (24) of the hydraulic tensioning device is removed after attachment of the crushing mantle (5) to the carrier cone (4) and prior to operation of the cone crusher. However, essential components of the hydraulic tensioning device, like a cylinder (18), a piston (19), a hydraulic conduit (21), remain in the cone carrier head during operation of the cone crusher, which leads to excessive wear of those components as well as to vibrations and impacts during operation. This reference discloses an apparatus and a method for attaching a cone-shaped crushing mantle of a cone crusher to a carrier cone of the cone crusher and for detaching the crushing mantle from the carrier cone of the kind mentioned at the beginning.

SUMMARY OF THE DISCLOSURE

Starting from the cited prior art, it is an object of the present invention to propose an alternative apparatus and method for attaching a cone-shaped crushing mantle of a cone crusher to a carrier cone of the cone crusher and for detaching the crushing mantle from the carrier cone.

In order to solve this object, an apparatus comprising the features of the independent apparatus claim is proposed. In particular, starting from the apparatus of the above-identified kind, it is proposed that

- the hydraulic pre-tensioning device is adapted to be applied externally to the pressure plate during the pre-tensioning process, such that a piston rod of the piston or a rod-shaped element attached thereto extends through the central opening of the pressure plate and is attached to the head region of the carrier cone, wherein the pressure chamber and the piston of the hydraulic pre-tensioning device are located on a side of the pressure plate opposite to the carrier cone, and
- wherein the hydraulic pre-tensioning device is further adapted to be released and removed from the pressure plate outside the pre-tensioning process.

Furthermore, in order to solve the above-identified object, a method comprising the features of the independent method claim is proposed. In particular, starting from the method of the above-identified kind, it is proposed that

- during the pre-tensioning process, the hydraulic pre-tensioning device is applied externally to the pressure plate such that a piston rod of the piston or a rod-shaped element attached thereto extends through the central opening of the pressure plate and is attached to the head region of the carrier cone, wherein the pressure chamber and the piston of the hydraulic pre-tensioning device are located on a side of the pressure plate opposite to the carrier cone, and
- outside the pre-tensioning process, the hydraulic pre-tensioning device is released and removed from the pressure plate.

The apparatus may comprise:

- a pressure plate adapted for resting on a top surface of the crushing mantle,
- the pressure plate comprising a central opening and at least two through holes located around the central opening preferably equidistantly located in respect to each other in a circumferential direction,
- at least two attachment screws, wherein one of the screws is assigned to each of the at least two through holes and wherein each of the screws is adapted to be inserted into the through hole to which it is assigned and to be screwed into a head region of the carrier cone, thereby pressing the crushing mantle against the carrier cone in an axial direction extending essentially parallel in respect to the carrier cone axis, and
- a hydraulically actuated pre-tensioning device adapted for pressing the crushing mantle against the carrier cone in a pre-tensioning process in the axial direction prior to tightening the screws in the head region of the carrier cone during attachment of the crushing mantle to the carrier cone and prior to loosening the screws in the head region of the carrier cone during detachment of the crushing mantle from the carrier cone, the hydraulic pre-tensioning device comprising a pressure chamber and a piston limiting the pressure chamber, the pressure chamber being adapted for receiving a pressurized hydraulic medium, whereby a volume of the pressure chamber is increased and the piston is moved, wherein movement of the piston is such that the crushing mantle is pressed against the carrier cone.

The method for attaching a cone-shaped crushing mantle of a cone crusher to a carrier cone of the cone crusher and for detaching the crushing mantle from the carrier cone may comprise the steps of:

- making a pressure plate rest on a top surface of the crushing mantle, the pressure plate comprising a central opening and at least two through holes located around the central opening preferably equidistantly in respect to each other in a circumferential direction,
- inserting an attachment screw into each of the through holes and screwing the screws into a head region of the carrier cone, thereby pressing the crushing mantle against the carrier cone in an axial direction extending essentially parallel in respect to a carrier cone axis,
- using a hydraulically actuated pre-tensioning device adapted for pressing the crushing mantle against the carrier cone in a pre-tensioning process in the axial direction prior to tightening the screws in the head region of the carrier cone during attachment of the crushing mantle to the carrier cone and prior to loosening the screws in the head region of the carrier cone during detachment of the crushing mantle from the carrier cone, wherein the hydraulic pre-tensioning device comprises a pressure chamber and a piston limiting the pressure chamber, actuating the pre-tensioning device by providing a pressurized hydraulic medium into the pressure chamber, thereby increasing a volume of the pressure chamber and moving the piston such that the crushing mantle is pressed against the carrier cone, and tightening the attachment screws for attaching the crushing mantle to the carrier cone or loosening the attachment screws for detaching the crushing mantle from the carrier cone.

Preferably, release of the pre-tensioning device from the pressure plate includes detaching the piston rod or the rod-shaped element attached thereto from the head region of the carrier cone and pulling it out of the central opening of the pressure plate.

A major advantage of the present invention is the fact that the hydraulic pre-tensioning device is completely removed from the head region of the carrier cone after the attachment screws, which are assigned to the pressure plate, have been mounted, for instance screwed into and tightened in the head region of the carrier cone thereby firmly attaching the crushing mantle to the carrier cone. The hydraulic pre-tensioning device is no longer present in the cone crusher during the intended use of the cone crusher, i.e. during the crushing of the fed material. The hydraulic pre-tensioning device is not subject of wear and not exposed to any mechanical stress (e.g. friction, shocks, vibration, etc.) that may occur during the intended use of the cone crusher.

Furthermore, the hydraulic pre-tensioning device can be easily applied to the pressure plate during the pre-tensioning process, that is prior to pressing the crushing mantle against the carrier cone in the axial direction and prior to tightening or loosening the screws in the head region of the carrier cone during attachment or detachment of the crushing mantle to/from the carrier cone. No separate tools are required for applying the hydraulic pre-tensioning device to the pressure plate during the pre-tensioning process. The order to tightening or loosening the screws in the head region of the carrier cone is of very little importance. Tightening and loosening of the screws may be effected without a separate tool, e.g. by hand, once the axial clamping force acts on the crushing mantle thereby pressing it against the carrier cone. However, it is understood that it may be advantageous if the screws are tightened to a defined torque by means of an appropriate tool, for instance a torque spanner, even with the pre-tensioning device, in order to ensure that all screws are evenly loaded when the pre-tensioning device is removed. Nonetheless, even with the use of a tool, it is advantageous that the torque with which the screws are tightened will be much lower than the torque required without the pre-tensioning device. Furthermore, the invention has a reduced risk of breaking the screws and of damaging the threads of the screws when the crushing mantle is attached to/detached from the carrier cone.

An indirect attachment of the piston rod may be provided by means of another rod-shaped element, attached on one end to the piston rod and on the other end to the head region of the carrier cone, for instance by means of the threaded connection.

Preferably, the cone-shaped crushing mantle is provided with an opening in its top surface. In that case, the attachment screws, with which the pressure plate is attached to the head region of the carrier cone thereby pressing the pressure plate onto the top surface of the crushing mantle, extend through the crushing mantle's opening. Furthermore, in that case the piston rod of the hydraulic pre-tensioning device extends through the central opening of the pressure plate as well as through the opening in the top surface of the crushing mantle.

Applying the hydraulic pre-tensioning device to the pressure plate preferably comprises a housing of the pre-tensioning device coming to rest on a side of the pressure plate opposite to the carrier cone and a piston rod of the piston of the pre-tensioning device extending through a central opening of the pressure plate and being attached to the head region of the carrier cone.

Preferably, the pressure chamber and the piston of the pre-tensioning device are located inside the housing of the pre-tensioning device, i.e. on the side of the pressure plate opposite to the carrier cone.

Attachment of the piston rod to the head region may be effected by means of a threaded connection or in any other suitable way. To this end it is proposed that the piston rod comprises an external thread which is screwed into a threaded hole provided in the head region of the carrier cone.

In order to achieve an attachment force, by which the crushing mantle is attached to the carrier cone, strong enough and evenly distributed around the carrier cone axis of the carrier cone, it is proposed that the apparatus comprises at least three, preferably five or seven, particularly preferred eight attachment screws. The attachment screws are preferably evenly distributed in respect to each other in a circumferential direction around the carrier cone axis, i.e. all neighbouring screws have the same circumferential distance in respect to each other.

During the pre-tensioning process, the pressure plate is always spaced apart from the carrier cone or its head region, respectively, so that the crushing mantle can be braced in respect to the carrier cone by activating the pre-tensioning device, pulling the carrier cone or its head region, respectively, towards the pressure plate and accordingly pressing the pressure plate onto the top surface of the crushing mantle.

It is further proposed that the pressure plate comprises at least two other holes (e.g. through holes or blind holes) adapted for receiving fixing means of a protective cap, outside the pre-tensioning process, when the cone-shaped crushing mantle has been firmly attached to the carrier cone and when the hydraulic pre-tensioning device has been released and removed from the pressure plate. The protective cap covers the pressure plate and the attachment screws during the intended use of the cone crusher. The protective cap is preferably made of steel, in particular a particularly hard steel, e.g. a medium or high carbon steel that has been given heat treatment and then quenching possibly followed by tempering. Preferably, the protective cap is made out of the same wear resistant manganese steel casting as the crushing mantle.

The at least two other holes are preferably threaded holes and the fixing means of the protective cap are preferably screws which are screwed into the threaded holes of the pressure plate. The screw heads for fastening the protective cap to the pressure plate are preferably recessed in a top surface of the protective cap in order to experience the least possible wear during intended use of the cone crusher.

It is proposed that the pressure plate has a slanted peripheral surface and is adapted to rest with its slanted peripheral surface on the top surface of the crushing mantle. Preferably, the slanted peripheral surface of the pressure plate rests on a similarly slanted inner circumferential surface surrounding an opening provided in the top surface of the crushing mantle. To this end, it is proposed that the crushing mantle in its top surface has an opening with an inclined inner circumferential surface surrounding the opening and the pressure plate is adapted to rest with its slanted peripheral surface on the inclined inner circumferential surface of the crushing mantle.

It is further proposed that the pressure plate has a collar- or sleeve-like section extending from a plate-like section of the pressure plate in an axial direction towards the crushing mantle. This embodiment of the pressure plate provides additional space between the plate-like section of the pressure plate and a top surface of the carrier cone or its head region, respectively. The additional space can be used by part of the carrier cone or its head region, respectively, extending through an opening in the top surface of the crushing mantle. This is particularly advantageous if the head region of the carrier cone comprises multiple parts attached to each other, for instance by means of friction or one or more threaded connections. The slanted peripheral surface, with which the pressure plate rests on the top surface of the crushing mantle, is preferably provided on a distal circumferential end of the collar- or sleeve-like section of the pressure plate opposite to the plate-like section of the pressure plate.

BRIEF DESCRIPTION OF THE DRAWINGS

Further advantages and embodiments of the present invention will become apparent by means of the accompanying figures and the following description. In this respect, it is emphasized that each of the features and characteristics shown in the figures may be important for the present invention on their own, even if not explicitly shown in the figures and/or not explicitly described in the following description. Furthermore, it is emphasized that the features and characteristics shown in the figures may be combined in any possible manner, even if not explicitly shown in the figures and/or not explicitly described in the following description. The figures show.

DETAILED DESCRIPTION

Figure 1:
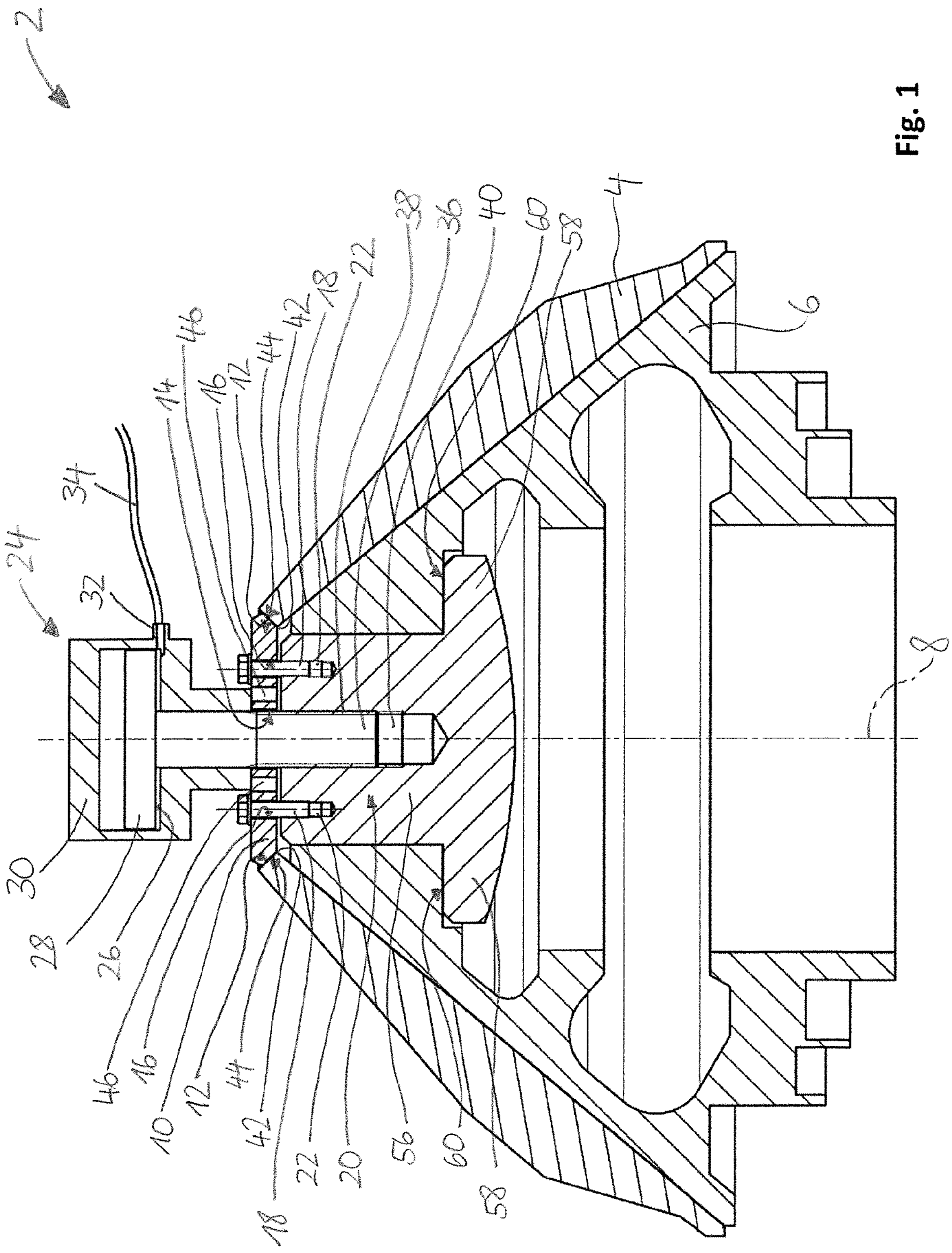
FIG. 1 a first embodiment of the present invention with a hydraulically actuated pre-tensioning device applied in a sectional view.

FIG. 1 shows an apparatus 2 according to a first embodiment of the present invention. The apparatus 2 serves for attaching a cone-shaped crushing mantle 4 of a cone crusher, in particular of a mobile cone crusher, to a carrier cone 6 of the cone crusher and for detaching the crushing mantle 4 from the carrier cone 6. The design and functioning of a cone crusher is described in detail in prior art reference WO 2010/086 488 A1 (U.S. Pat. No. 8,944,356) which is incorporated herein by reference in its entirety. A mobile cone crusher is mounted onto a chassis provided with wheels, skids, chains or tracks in order to load the cone crusher on a transporter, to drive the cone crusher to its destined place of operation and to align it at its place of operation. The mobile cone crusher may be self-propelled or moved by a propelling vehicle.

Figure 5:
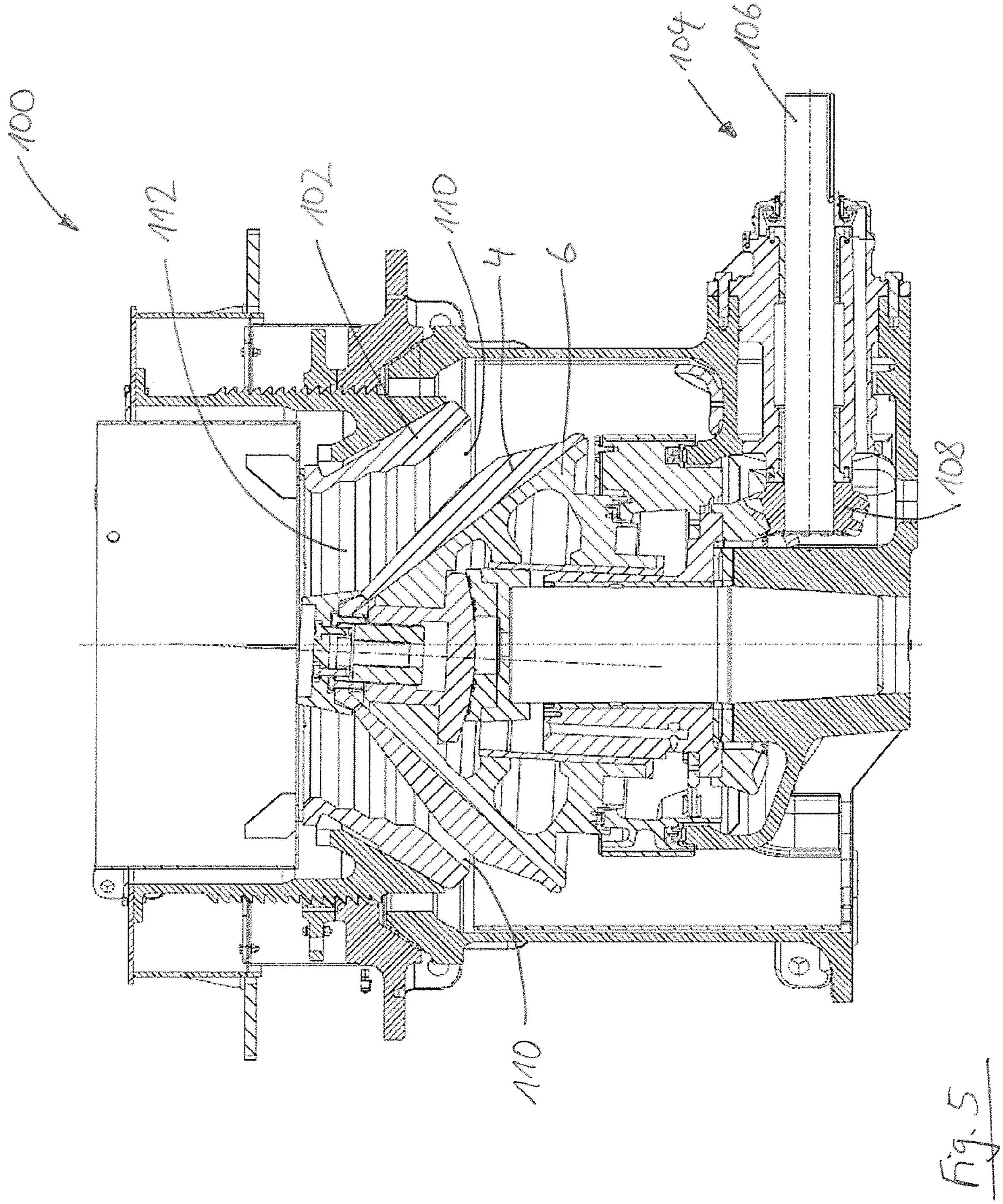
FIG. 5 a cone crusher according to the present invention.

A cone crusher 100 according to the present invention is shown in detail in FIG. 5. The cone crusher 100 is a compression type of machine that reduces the size of fed material by squeezing or compressing between a moving piece (crushing mantle 4 or inner crushing blade) usually made of steel and a stationary piece (crushing ring 102 or outer crushing blade) usually made of steel. The fed material is in particular a mineral material like stone, rock, concrete or the like.

During operation of the cone crusher 100, the crushing mantle 4 moves eccentrically in respect to the fixed crushing ring 102. The carrier cone 6 is set into a tumbling or oscillating motion by a driving mechanism 104 of the cone crusher 100. In FIG. 5 the driving mechanism 104 comprises a drive shaft 106 and a bevel gear 108. However, other embodiments are conceivable, too. The drive shaft 106 is driven by a motor (not shown). The dimensions of a crushing gap 110 (or chamber 112) between the fixed crushing ring 102 and the rotating crushing mantle 4 in a certain point along the circumferential direction change continuously. In the crushing chamber 112, the material to be crushed is crushed by squeezing and compressing until it can leave the cone crusher 100 as crushed material through the crushing gap 110. With other words, the carrier cone 6 with the crushing mantle 4 is entrained in an oscillating or gyrating motion about a rotational axis, wherein the crushing gap 110 between the crushing mantle 4 and the outer crushing ring 102 varies at each point during the cycle.

The smallest crusher gap 110 occurring during the cycle is called the closed side setting (CSS) of the cone crusher 100, and the difference between the maximum and the minimum of the gap 110 is called the stroke of the crusher 100. By the crusher setting and the crusher stroke, as well as the operating speed of the crusher 100, it is possible, among other things, to influence the grain size distribution of the crushed material and the production capacity of the crusher 100.

The outer crushing ring 102 as well as the inner crushing mantle 4 are used as wearing parts during operation of the cone crusher 100 and, therefore, have to be replaced from time to time. The apparatus 2 according to the invention is provided for easy and fast attachment and detachment of a crushing mantle 4 to/from the carrier cone 6. The apparatus 2 is used in a cone crusher 100 according to the invention.

The apparatus 2 comprises a pressure plate 10 adapted for resting on a top surface 12 of the crushing mantle 4. The pressure plate 10 comprises a central opening 14 and at least two through holes 16 located around the central opening 14 preferably equidistantly in respect to each other in a circumferential direction. Neighbouring through holes 16 could also be located in different circumferential distances in respect to each other. Preferably, the through holes 16 have the same distance in respect to the carrier cone axis 8. The through holes 16 may also take the form of and are intended to comprise not only round holes but also slots, cut outs or the like of any given cross sectional area.

The apparatus 2 further comprises at least two attachment screws 18, wherein one of the screws 18 is assigned to each of the at least two through holes 16. Each of the screws 18 is adapted to be inserted into the through hole 16 to which it is assigned and to be screwed into a head region 20 of the carrier cone 6. To this end, the head region 20 is provided with threaded blind holes 22, one for each screw 18. By screwing and tightening the screws 18 in the blind holes 22, the pressure plate 10 is pressed axially downwards towards the carrier cone 6 or its head region 20, respectively, and the crushing mantle 4 is pressed against the carrier cone 6 in an axial direction extending essentially parallel in respect to the carrier cone axis 8.

Furthermore, the apparatus 2 comprises a hydraulically actuated pre-tensioning device 24, which may also be referred to as a pre-tensioning actuator 24, adapted for pressing the crushing mantle 4 against the carrier cone 6 in a pre-tensioning process in the axial direction prior to tightening the attachment screws 18 in the head region 20 of the carrier cone 6 during attachment of the crushing mantle 4 to the carrier cone 6 and prior to loosening the screws 18 in the head region 20 of the carrier cone 6 during detachment of the crushing mantle 4 from the carrier cone 6. The hydraulic pre-tensioning device 24 comprises a pressure chamber 26 and a piston 28 limiting the pressure chamber 26. The pressure chamber 26 and the piston 28 are provided inside a housing 30 of the pre-tensioning device 24. The pressure chamber 26 is adapted for receiving a pressurized hydraulic medium, e.g. a fluid medium like oil, water or the like. By supplying the hydraulic medium 20 the pressure chamber 26, a volume of the pressure chamber 26 is increased and the piston 28 is moved. To this end, it is proposed to provide a port 32 for the hydraulic medium in the housing 30, the port 32 opening into the pressure chamber 26. A hose or tube 34 for the pressurized hydraulic medium may be attached to the port 32. A hydraulic pressure generation device (not shown), like a hydraulic pump, may be attached to an end of the hose or tube 34 opposite to the port 32.

In the present embodiment of FIG. 1, supply of pressurized hydraulic medium to the pressure chamber 26 will cause the piston 28 to move upwards in a direction essentially parallel to the carrier cone axis 8. Thus, movement of the piston 28 is such that the crushing mantle 4 is pressed via the pressure plate 10 against the carrier cone 6.

In an alternative embodiment of the invention, which is not shown in the figures, the hydraulic pressure generation device could also make part of the hydraulic pre-tensioning device 24 and be located inside the housing 30. In that case the hydraulic pressure is generated inside the device 24 and the internal hydraulic pressure generation device would supply the pressurized hydraulic; the hose or tube 34 and the connection to the port 32 would merely have to be fluid tight and to resist rather low pressure values. The actual high pressure of the hydraulic medium could then be generated inside the hydraulic pre-tensioning device 24. In that case, it would be sufficient if a simple container for the hydraulic fluid, e.g. a fluid tank or the like, was attached to the hose or tube 34 opposite to the port 32.

The hydraulic pre-tensioning device 24 is adapted to be applied externally to the pressure plate 10 during the pre-tensioning process, such that a piston rod 36 of the piston 28 extends through the central opening 14 of the pressure plate 10 and is attached to the head region 20 of the carrier cone 6. Applying the hydraulic pre-tensioning device 24 to the pressure plate 10 preferably comprises the housing 30 of the pre-tensioning device 24 coming to rest on a side of the pressure plate 10 opposite to the carrier cone 6 and the piston rod 36 of the piston 28 of the pre-tensioning device 24 extending through the central opening 14 of the pressure plate 14 and being attached to the head region 20 of the carrier cone 6.

With the hydraulic pre-tensioning device 24 being applied to the pressure plate 10, the housing 30 is located on a side of the pressure plate 10 opposite to the carrier cone 6. Thus, also the pressure chamber 26 and the piston 28 of the hydraulic pre-tensioning device 24 are located on the side of the pressure plate 10 opposite to the carrier cone 6.

Attachment of the piston rod 36 to the head region 20 of the carrier cone 6 may be realized directly or indirectly by means of a threaded connection 38, comprising an external thread on the outer circumferential surface of the piston rod 36 and an internal thread in a blind hole 40 of the head region 20. Of course, other suitable attachment types are also conceivable. An indirect attachment of the piston rod 36 may be provided by means of another rod-shaped element (not shown), attached on one end to the piston rod 36 and on the other end to the head region 20 of the carrier cone 6, for instance by means of the threaded connection 38.

The hydraulic pre-tensioning device 24 is further adapted to be released and removed from the pressure plate 10 outside the pre-tensioning process, i.e. before or after the pre-tensioning process. Releasing the pre-tensioning device 24 includes detaching the piston rod 36—or in the case of an indirect attachment of the piston rod 36, the other rod-shaped element—from the head region 20 of the carrier cone 6 and pulling it out of the central opening 14 of the pressure plate 10. Alternate embodiments could have the piston rod 36 left in the head region 20 of the carrier cone 6 or turned further into the head region 20 after the hydraulic pre-tensioning device 24 is removed.

According to the invention, the pressure plate 10 presses the crushing mantle 4 onto the carrier cone 6. The pressure plate 10 is fixed to the head region 20 of the cone 6 by the attachment screws 18. The number of screws 18 may be three, preferably five or seven and particularly preferable eight. The screws 18 are preferably located equidistantly in respect to the carrier cone axis 8 and neighbouring screws 18 are preferably located equidistantly in a circumferential direction. Ultimately, these screws 18 provide for the attachment force for holding the crushing mantle 4 on the carrier cone 6. For an easy and quick assembly and disassembly of the attachment screws 18, the hydraulic pre-tensioning device 24 is used.

The following procedure is realized for mounting the crushing mantle 4 to the carrier cone 6:

- arranging the crushing mantle 4 on the carrier cone 6,
- arranging the pressure plate 10 on the crushing mantle 4, so that it rests on the top surface 12 of the crushing mantle 4,
- mounting the attachment screws 18 hand tight,
- mounting the hydraulic pre-tensioning device 24, i.e. arranging it on the side of the pressure plate 10 opposite to the carrier cone 6 and attaching the piston rod 36 to the head region 20 of the carrier cone 6,
- putting the pressure chamber 26 under hydraulic pressure thereby pulling the carrier cone 6 towards the pressure plate 10 and the crushing mantle 4, respectively,
- re-tightening the attachment screws 18 using relatively low forces,
- releasing the hydraulic pressure in the pressure chamber 26,
- dismounting the hydraulic pre-tensioning device 24.

Dismounting the hydraulic pre-tensioning device 24 may comprise detaching the piston rod 36 from the head region 20 of the carrier cone 6 and removing the piston rod 36 through the central opening 14 of the pressure plate 10. Alternate embodiments could have the piston rod 36 left in the head region 20 of the carrier cone 6 or turned further into the head region 20 after the hydraulic pre-tensioning device 24 is removed.

Re-tightening the attachment screws 18 is preferably performed with the help of a suitable tool, e.g. a hand wrench. The screws 18 may be tightened to a specific torque to ensure equal sharing of the load. The torque will be significantly lower than the torque required without the pre-tensioning device 24.

For loosening and detaching the crushing mantle 4 from the carrier cone 6 the procedure is executed in the opposite direction. In particular, the following procedure is realized:

- mounting the hydraulic pre-tensioning device 24, i.e. arranging it on the side of the pressure plate 10 opposite to the carrier cone 6 and attaching the piston rod 36 to the head region 20 of the carrier cone 6,
- putting the pressure chamber 26 under hydraulic pressure thereby pulling the carrier cone 6 towards the pressure plate 10 and the crushing mantle 4, respectively,
- loosening and unscrewing the attachment screws 18 using relatively low forces,
- releasing the hydraulic pressure in the pressure chamber 26,
- dismounting the hydraulic pre-tensioning device 24,
- removing the pressure plate 10 from the crushing mantle 4,
- removing the crushing mantle 4 from the carrier cone 6.

Dismounting the hydraulic pre-tensioning device 24 may comprise detaching the piston rod 36 from the head region 20 of the carrier cone 6 and removing the piston rod 36 through the central opening 14 of the pressure plate 10. Alternate embodiments could have the piston rod 36 left in the head region 20 of the carrier cone 6 or turned further into the head region 20 after the hydraulic pre-tensioning device 24 is removed. It is emphasized that the piston rod 36 does not need to be removed until a new crushing mantle 4 is installed.

Loosening the attachment screws 18 is preferably performed with the help of a suitable tool, e.g. a hand wrench.

With the use of the hydraulic pre-tensioning device 24 of the described type and in the manner described herein, the assembly and disassembly of the crushing mantle 4 on/from the carrier cone 6 is fast, easy and safe. Even if in exceptional situations the hydraulic pre-tensioning device 24 is not available, it is possible to assemble or disassemble the crushing mantle 4 from the carrier cone 6 in the conventional way. In this case the attachment screws 18 would have to be tightened and loosened with the help of a standard tool, for instance a hand wrench, in a predefined distinct order, in order to avoid tension and canting.

A major advantage of the present invention is the fact that the hydraulic pre-tensioning device 24 is completely removed from the head region 20 of the carrier cone 6 after the attachment screws 18, which are assigned to the pressure plate 10, have been screwed into and tightened in the head region 20 of the carrier cone 6 thereby firmly attaching the crushing mantle 4 to the carrier cone 6. The hydraulic pre-tensioning device 24 is no longer present in the cone crusher 100 during the intended use of the cone crusher 100, i.e. during the crushing of the fed material. The hydraulic pre-tensioning device 24 is not exposed to any mechanical stress (e.g. friction, shocks, vibration, etc.) that may occur during the intended use of the cone crusher 100.

Preferably, the cone-shaped crushing mantle 4 is provided with an opening 42 in its top surface 12. In the shown embodiments, the opening 42 is delimited and surrounded by a ring-shaped inner circumferential surface of the top surface 12 having a slanted extension when viewed in a sectional view comprising the carrier cone axis 8. The pressure plate 10 has a correspondingly slanted peripheral surface 44 and is adapted to rest with its slanted peripheral surface 44 on the slanted inner circumferential surface of the top surface 12 of the crushing mantle 4. In that case, the attachment screws 18, with which the pressure plate 10 is attached to the head region 20 of the carrier cone 6 thereby pressing the pressure plate 10 onto the top surface 12 of the crushing mantle 4, extend through the crushing mantle's opening 42. Furthermore, in that case the piston rod 36 of the hydraulic pre-tensioning device 24 extends through the central opening 14 of the pressure plate 10 as well as through the opening 42 in the top surface 12 of the crushing mantle 4.

During the pre-tensioning process, the pressure plate 10 is always spaced apart from the carrier cone 6 or its head region 20, respectively, in an axial direction, so that the crushing mantle 4 can be braced in respect to the carrier cone 6 by activating the pre-tensioning device 24, thereby pulling the carrier cone 6 or its head region 20, respectively, towards the pressure plate 10 and accordingly pressing the pressure plate 10 onto the top surface 12 of the crushing mantle 4.

It is further proposed that the pressure plate 10 comprises at least two other holes 46 (e.g. through holes or blind holes) adapted for receiving fixing means 48 (cf. FIG. 2) of a protective cap 50, outside the pre-tensioning process, when the cone-shaped crushing mantle 4 has been firmly attached to the carrier cone 6 and when the hydraulic pre-tensioning device 24 has been released and removed from the pressure plate 10. The protective cap 50 covers the pressure plate 10 and the attachment screws 18 during the intended use of the cone crusher 100. The protective cap 50 is preferably made of steel, in particular a particularly hard steel, e.g. a medium or high carbon steel that has been given heat treatment and then quenching possibly followed by tempering. Preferably, the protective cap 50 is made out of the same wear resistant manganese steel casting as the crushing mantle 4.

The at least two other holes 46 are preferably threaded holes and the fixing means 48 of the protective cap 50 are preferably screws which are screwed into the threaded holes 46 of the pressure plate 10. The screw heads 52 for fastening the protective cap 50 to the pressure plate 10 are preferably recessed in a top surface 54 of the protective cap 50 in order to experience the least possible wear during intended use of the cone crusher 100.

Figure 2:
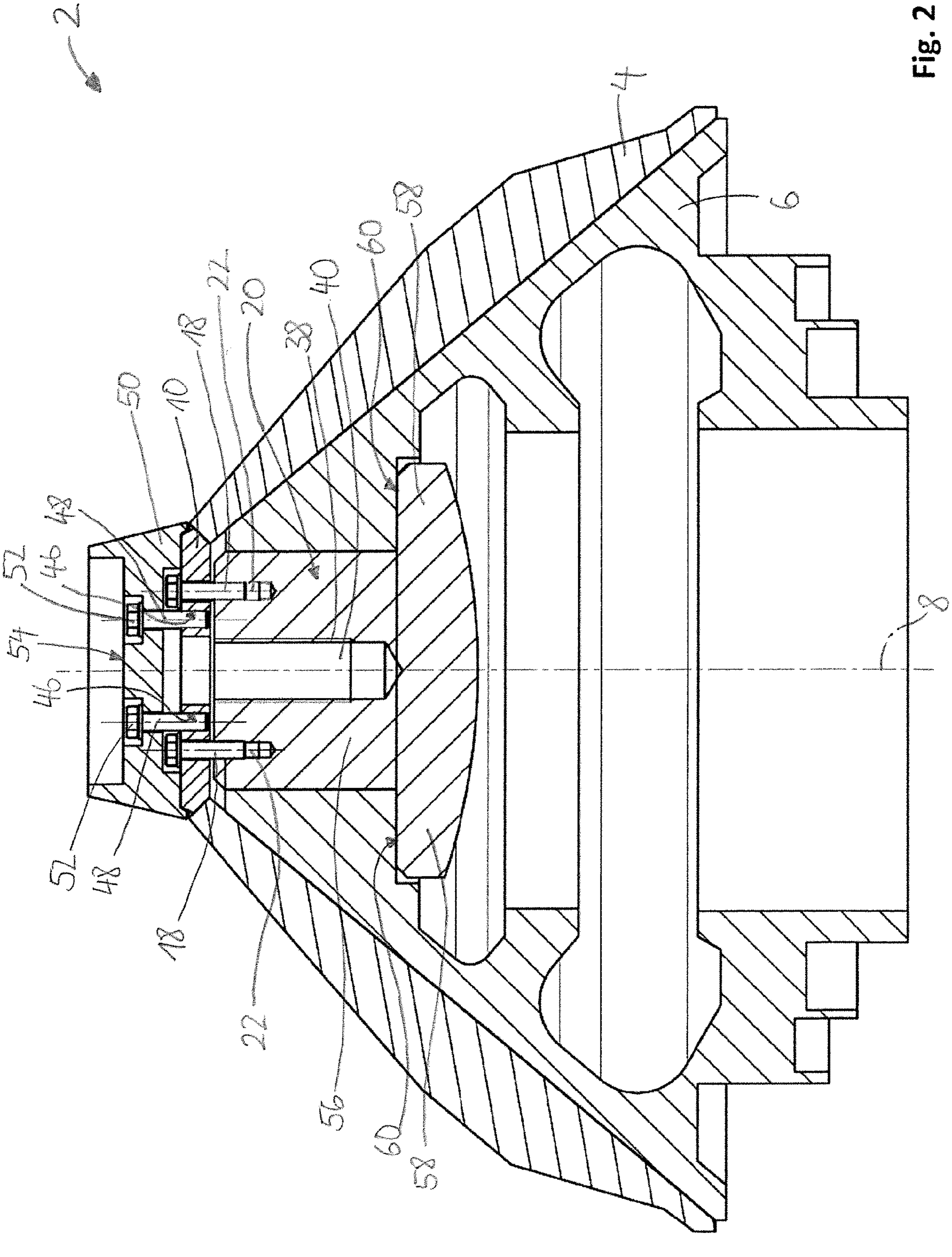
FIG. 2 the embodiment of FIG. 1 without the hydraulic pre-tensioning device in a sectional view.

In the embodiment of FIGS. 1 and 2, the carrier cone 6 has an anchoring element 56, which is introduced into a respective opening in the head region 20 of the carrier cone 6 from below. The anchoring element 56 has a collar 58 extending in an essentially radial direction thereby providing a contact surface 60 with which the anchoring element 56 abuts against the rest of the carrier cone 6 after insertion into the opening in the head region 20. The anchoring element 56 may constitute part of or the entire head region 20 of the carrier cone 6. The threaded blind hole 40 is provided in the anchoring element 56. The threaded blind holes 22 are also provided in the anchoring element 56. Of course, the carrier cone 6 could also be realized as a single component without the separate anchoring element 56.

Figure 3:
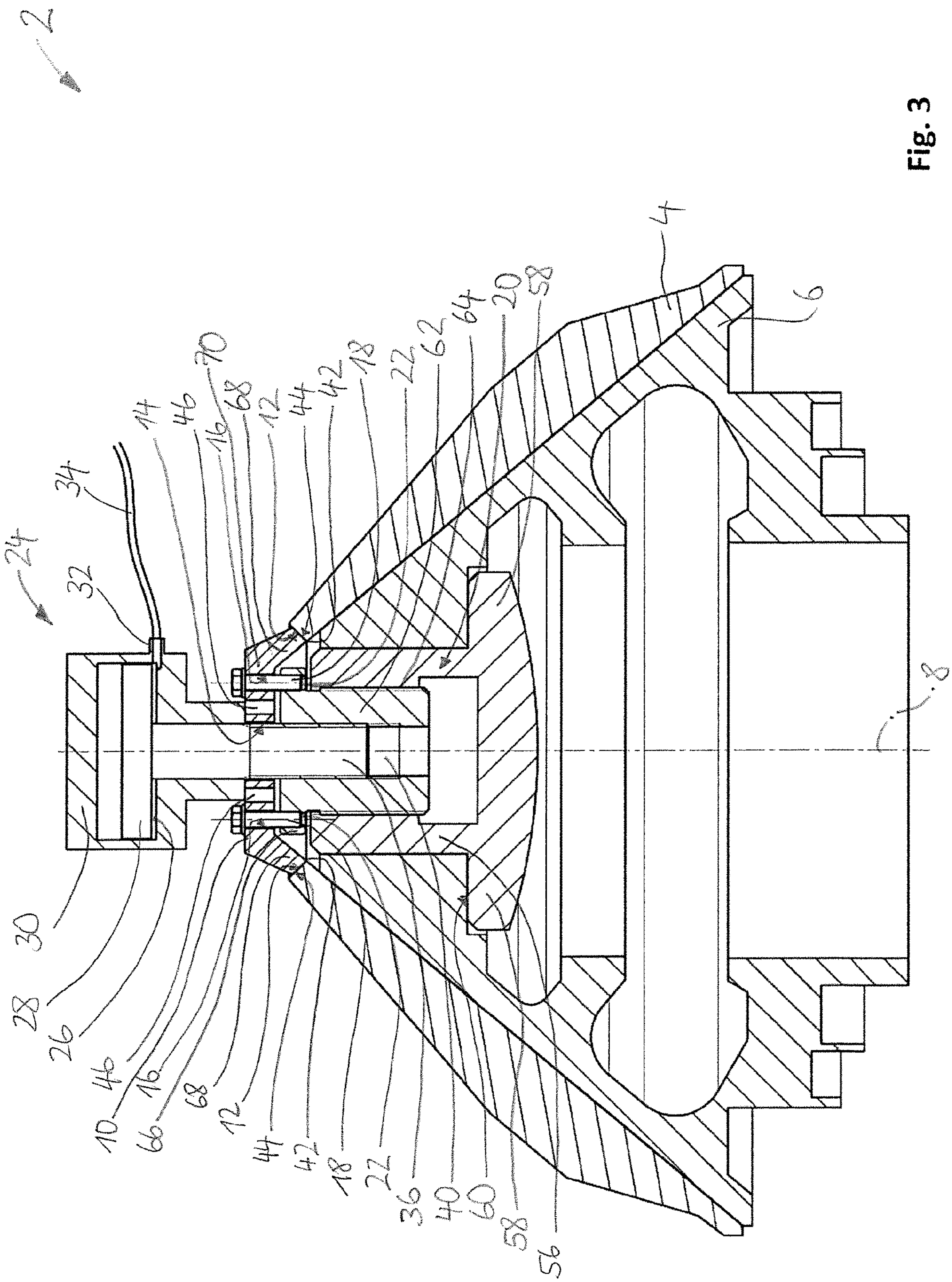
FIG. 3 a second embodiment of the present invention with a hydraulically actuated pre-tensioning device applied in a sectional view.
Figure 4:
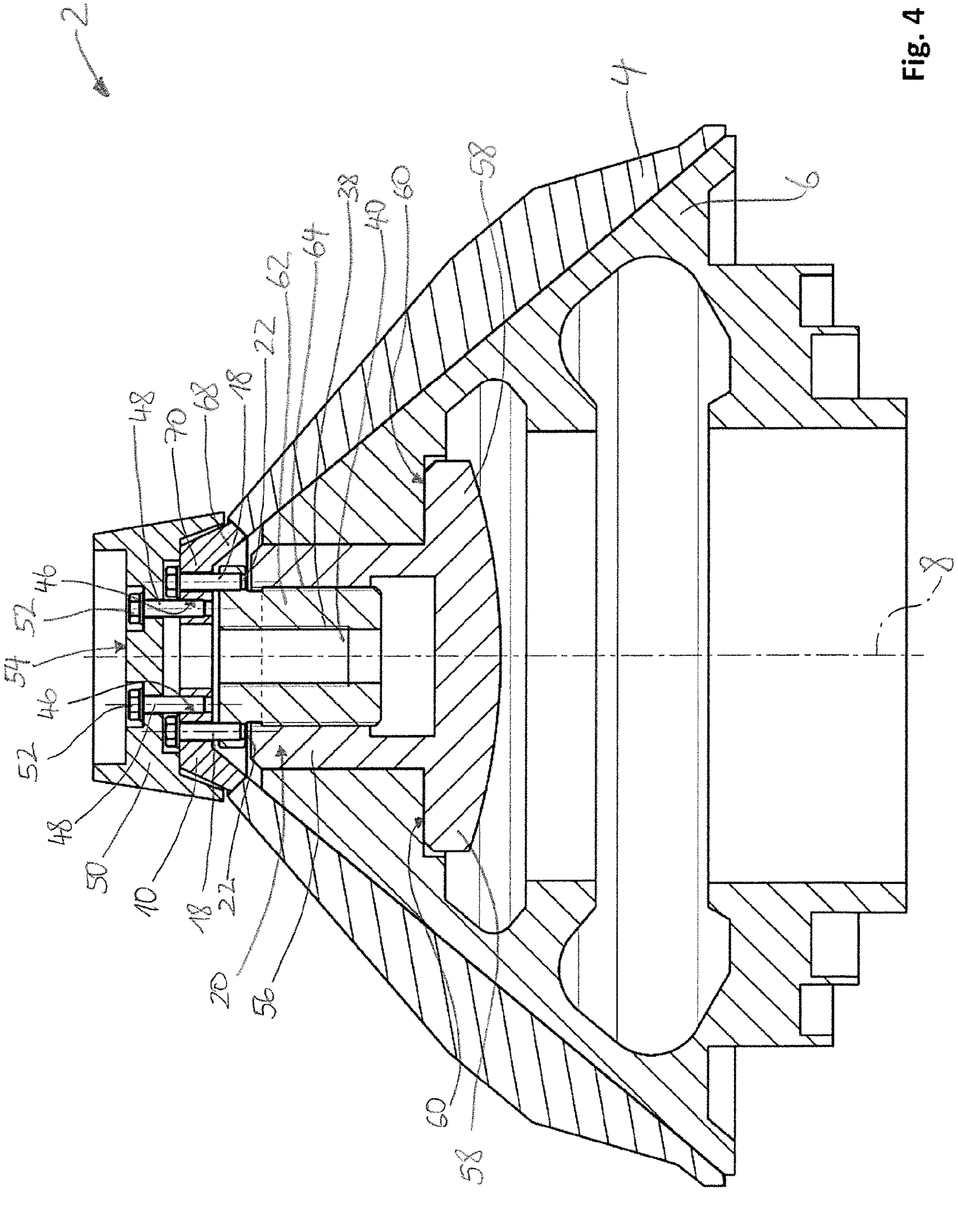
FIG. 4 the embodiment of FIG. 3 without the hydraulic pre-tensioning device in a sectional view.

In the embodiment shown in FIGS. 3 and 4, the carrier cone 6 has a sleeve-like element 62 which is inserted and fixed in a hole of the anchoring element 56. Preferably, the sleeve-like element 62 is fixed in the opening of the anchoring element 56 by means of a threaded connection 64 comprising an external thread on the external circumferential surface of the sleeve-like element 62 and an internal thread in the lateral walls of the hole of the anchoring element 56. The sleeve-like element 62 has a collar 66 extending in an essentially radial direction. The sleeve-like element 62 constitutes part of the head region 20 of the carrier cone 6. The threaded blind hole 40 is provided in the sleeve-like element 62. The threaded blind holes 22 are provided in the collar 66 of the sleeve-like element 62. Of course, the carrier cone 6 could also be realized as a single component without the separate anchoring element 56 and sleeve-like element 62.

It is further proposed that the pressure plate 10 of FIGS. 3 and 4 has a collar- or sleeve-like section 68 extending from a plate-like section 70 of the pressure plate in an axial direction towards the crushing mantle 4. It may be sufficient if the collar- or sleeve-like section 68 has an axial component of extension. It is not necessary for the collar- or sleeve-like section 68 to extend exclusively in the axial direction. In FIGS. 3 and 4 the collar- or sleeve-like section 68 also has a radial component of extension.

Such a design of the pressure plate 10 provides additional space between the plate-like section 70 of the pressure plate 10 and a top surface of the carrier cone 6 or its head region 20, respectively. In the embodiment of FIGS. 3 and 4, the top surface of the carrier cone 6 is formed by a surface of the sleeve-like element 62 facing the plate-like section 70 of the pressure plate 10. The additional space is particularly advantageous if the head region 20 of the carrier cone 6 comprises multiple parts, like parts 6, 56, 62, attached to each other, for instance by means of friction or one or more threaded connections. The slanted peripheral surface 44, with which the pressure plate rests on the top surface 12 of the crushing mantle 4, is preferably provided on a distal circumferential end of the collar- or sleeve-like section 68 of the pressure plate opposite to the plate-like section 70 of the pressure plate 10. In the shown embodiment, the top part of the sleeve-like element 62, in particular the collar 66, are arranged in the additional space provided within the pressure plate 10 or its collar- or sleeve-like section 68, respectively.

Further Disclosure:

The following further disclosure is in the form of clauses which are representative of additional claims that Applicant may pursue:

Clause 1. Apparatus (2) for attaching a cone-shaped crushing mantle (4) of a cone crusher (100) to a carrier cone (6) of the cone crusher (100) and for detaching the crushing mantle (4) from the carrier cone (6), the carrier cone (6) having a carrier cone axis (8), the apparatus (2) comprising a pressure plate (10) adapted for resting on a top surface (12) of the crushing mantle (4), the pressure plate (10) comprising a central opening (14) and at least two through holes (16) located around the central opening (14) preferably equidistantly in respect to each other in a circumferential direction, at least two attachment screws (18), wherein one of the screws (18) is assigned to each of the at least two through holes (16) and wherein each of the screws (18) is adapted to be inserted into the through hole (16) to which it is assigned and to be screwed into a head region (20) of the carrier cone (6), thereby pressing the crushing mantle (4) against the carrier cone (6) in an axial direction extending essentially parallel in respect to the carrier cone axis (8), and a hydraulically actuated pre-tensioning device (24) adapted for pressing the crushing mantle (4) against the carrier cone (6) in a pre-tensioning process in the axial direction prior to tightening the screws (18) in the head region (20) of the carrier cone (6) during attachment of the crushing mantle (4) to the carrier cone (6) and prior to loosening the screws (18) in the head region (20) of the carrier cone (6) during detachment of the crushing mantle (4) from the carrier cone (6), the hydraulic pre-tensioning device (24) comprising a pressure chamber (26) and a piston (28) limiting the pressure chamber (26), the pressure chamber (26) being adapted for receiving a pressurized hydraulic medium, whereby a volume of the pressure chamber (26) is increased and the piston (28) is moved, wherein movement of the piston (28) is such that the crushing mantle (4) is pressed against the carrier cone (6), characterized in that the hydraulic pre-tensioning device (24) is adapted to be applied externally to the pressure plate (10) during the pre-tensioning process, such that a piston rod (36) of the piston (28) or a rod-shaped element attached thereto extends through the central opening (14) of the pressure plate (10) and is attached to the head region (20) of the carrier cone (6), wherein the pressure chamber (26) and the piston (28) of the hydraulic pre-tensioning device (24) are located on a side of the pressure plate (10) opposite to the carrier cone (6), and wherein the hydraulic pre-tensioning device (24) is further adapted to be released from the pressure plate (10) outside the pre-tensioning process.

Clause 2. Apparatus (2) according to clause 1, wherein release of the pre-tensioning device (24) from the pressure plate (10) includes detaching the piston rod (36) from the head region (20) of the carrier cone (6) and pulling it out of the central opening (14) of the pressure plate (10).

Clause 3. Apparatus (2) according to clause 1 or 2, wherein the pre-tensioning device (24) comprises a housing (30) which, during the pre-tensioning process, rests on the side of the pressure plate (10) opposite to the carrier cone (6).

Clause 4. Apparatus (2) according to clause 3, wherein the pressure chamber (26) and the piston (28) are located inside the housing (30).

Clause 5. Apparatus (2) according to one of the preceding clauses, wherein the piston rod (36) comprises an external thread which, during the pre-tensioning process, is screwed into a threaded hole (40) provided in the head region (20) of the carrier cone (6).

Clause 6. Apparatus (2) according to one of the preceding clauses, wherein the apparatus (2) comprises at least three, preferably five or seven, particularly preferred eight attachment screws (18).

Clause 7. Apparatus (2) according to one of the preceding clauses, wherein the pressure plate (10) comprises at least two other holes (46) adapted for receiving fixing means (48) of a protective cap (50), outside the pre-tensioning process and when the hydraulic pre-tensioning device (24) has been released from the pressure plate (10).

Clause 8. Apparatus (2) according to clause 7, wherein the at least two other holes (46) are threaded holes and wherein the fixing means (48) of the protective cap (50) are screws.

Clause 9. Apparatus (2) according to one of the preceding clauses, wherein the pressure plate (10) has a slanted peripheral surface (44) and is adapted to rest with its slanted peripheral surface (44) on the top surface (12) of the crushing mantle (4).

Clause 10. Apparatus (2) according to one of the preceding clauses, wherein the crushing mantle (4) in its top surface (12) has an opening (42) with an inclined inner circumferential surface surrounding the opening (42) and the pressure plate (10) is adapted to rest with its slanted peripheral surface (44) on the inclined inner circumferential surface of the crushing mantle (4).

Clause 11. Method for attaching a cone-shaped crushing mantle (4) of a cone crusher (100) to a carrier cone (6) of the cone crusher (100) and for detaching the crushing mantle (4) from the carrier cone (6), the carrier cone (6) having a carrier cone axis (8), the method comprising making a pressure plate (10) rest on a top surface (12) of the crushing mantle (4), the pressure plate (10) comprising a central opening (14) and at least two through holes (16) located around the central opening (14) preferably equidistantly in respect to each other in a circumferential direction, inserting an attachment screw (18) into each of the through holes (16) and screwing the screws (18) into a head region (20) of the carrier cone (6), thereby pressing the crushing mantle (4) against the carrier cone (6) in an axial direction extending essentially parallel in respect to the carrier cone axis (8), using a hydraulically actuated pre-tensioning device (24) adapted for pressing the crushing mantle (4) against the carrier cone (6) in a pre-tensioning process in the axial direction prior to tightening the screws (18) in the head region (20) of the carrier cone (6) during attachment of the crushing mantle (4) to the carrier cone (6) and prior to loosening the screws (18) in the head region (20) of the carrier cone (6) during detachment of the crushing mantle (4) from the carrier cone (6), wherein the hydraulic pre-tensioning device (24) comprises a pressure chamber (26) and a piston (28) limiting the pressure chamber (26), actuating the pre-tensioning device (24) by providing a pressurized hydraulic medium into the pressure chamber (26), thereby increasing a volume of the pressure chamber (26) and moving the piston (28) such that the crushing mantle (4) is pressed against the carrier cone (6), and tightening the attachment screws (18) for attaching the crushing mantle (4) to the carrier cone (6) or loosening the attachment screws (18) for detaching the crushing mantle (4) from the carrier cone (6), characterized in that during the pre-tensioning process, the hydraulic pre-tensioning device (24) is applied externally to the pressure plate (10) such that a piston rod (36) of the piston (28) or a rod-shaped element attached thereto extends through the central opening (14) of the pressure plate (10) and is attached to the head region (20) of the carrier cone (6), wherein the pressure chamber (26) and the piston (28) of the hydraulic pre-tensioning device (24) are located on a side of the pressure plate (10) opposite to the carrier cone (6), and outside the pre-tensioning process, the hydraulic pre-tensioning device (24) is released from the pressure plate (10).

Clause 12. Method according to clause 11, wherein the step of releasing the pre-tensioning device (24) from the pressure plate (10) includes detaching the piston rod (36) from the head region (20) of the carrier cone (6) and pulling the piston rod (36) out of the central opening (14) of the pressure plate (10).

Clause 13. Method according to clause 11 or 12, wherein the piston rod (36) has an external thread and, before the pre-tensioning process, is screwed into a threaded hole (22) provided in the head region (20) of the carrier cone (6).

Clause 14. Method according to one of the preceding clauses 11 to 13, wherein outside the pre-tensioning process and when the hydraulic pre-tensioning device (24) has been released from the pressure plate (10), a protective cap (50) covering the pressure plate (10) is installed.

Clause 15. Method according to clause 14, wherein installation of the protective cap (50) comprises inserting fixing means (48) of the protective cap (50) into at least two other holes (46) provided in the pressure plate (10) thereby attaching the protective cap (50) to the pressure plate (10).

Clause 16. Method according to clause 14, wherein installation of the protective cap (50) comprises inserting screws (48) of the protective cap (50) into at least two other threaded holes (46) of the pressure plate (10) thereby attaching the protective cap (50) to the pressure plate (10).

Clause 17. Cone crusher (100) comprising a cone-shaped crushing mantle (4) and a carrier cone (6), wherein the crushing mantle (4) is attached to the carrier cone (6) and/or detached from the carrier cone (6) by means of an apparatus (2) according to one or more of the clauses 1 to 10.

What is claimed is:

1. An apparatus for attaching a cone-shaped crushing mantle of a cone crusher to a carrier cone of the cone crusher and for detaching the crushing mantle from the carrier cone, the carrier cone having a carrier cone axis and a head region, the apparatus comprising:

a pressure plate configured to rest on a top surface of the crushing mantle;

the pressure plate including a central opening and at least two through holes located around the central opening equidistantly in respect to each other in a circumferential direction;

at least two attachment screws, wherein one of the screws is assigned to each of the at least two through holes and wherein each of the screws is configured to be inserted into the through hole to which it is assigned and to be screwed into the head region of the carrier cone, thereby pressing the crushing mantle against the carrier cone in an axial direction extending parallel in respect to the carrier cone axis; and a hydraulically actuated pre-tensioning actuator configured to press the crushing mantle against the carrier cone in a pre-tensioning process in the axial direction prior to tightening the screws in the head region of the carrier cone during attachment of the crushing mantle to the carrier cone and prior to loosening the screws in the head region of the carrier cone during detachment of the crushing mantle from the carrier cone, the hydraulic pre-tensioning actuator including a pressure chamber and a piston limiting the pressure chamber, the pressure chamber being configured to receive a pressurized hydraulic medium, whereby when a volume of the pressure chamber is increased the piston is moved such that the crushing mantle is pressed against the carrier cone;

wherein the hydraulic pre-tensioning actuator is configured to be applied externally to the pressure plate during the pre-tensioning process, such that a piston rod of the piston or a rod-shaped element attached to the piston rod extends through the central opening of the pressure plate and is attached to the head region of the carrier cone, wherein the pressure chamber and the piston of the hydraulic pre-tensioning actuator are located on a side of the pressure plate opposite to the carrier cone; and wherein the hydraulic pre-tensioning actuator is configured to be released from the pressure plate outside the pre-tensioning process.

2. The apparatus according to claim 1, wherein the pre-tensioning actuator is configured such that during release of the pre-tensioning actuator from the pressure plate, the piston rod or the rod-shaped element attached thereto is detached from the head region of the carrier cone and pulled out of the central opening of the pressure plate.

3. The apparatus according to claim 1, wherein the pre-tensioning actuator comprises a housing which is configured to rest on the side of the pressure plate opposite to the carrier cone during the pre-tensioning process.

4. The apparatus according to claim 3, wherein the pressure chamber and the piston are located inside the housing.

5. The apparatus according to claim 1, wherein the piston rod or the rod-shaped element attached thereto comprises an external thread configured such that during the pre-tensioning process the external thread is screwed into a threaded hole provided in the head region of the carrier cone.

6. The apparatus according to claim 1, wherein the at least two attachment screws comprises at least three attachment screws.

7. The apparatus according to claim 1, wherein the at least two attachment screws comprises at least five attachment screws.

8. The apparatus according to claim 1, wherein the at least two attachment screws comprises at least seven attachment screws.

9. The apparatus according to claim 1, wherein the pressure plate comprises at least two other holes configured to receive fixing means of a protective cap, outside the pre-tensioning process and after the hydraulic pre-tensioning actuator has been released from the pressure plate.

10. The apparatus according to claim 9, wherein the at least two other holes are threaded holes and wherein the fixing means of the protective cap are screws.

11. The apparatus according to claim 1, wherein the pressure plate includes a slanted peripheral surface and the pressure plate is configured to rest with the slanted peripheral surface on the top surface of the crushing mantle.

12. The apparatus according to claim 11, wherein the crushing mantle in its top surface has an opening with an inclined inner circumferential surface surrounding the opening and the pressure plate is configured to rest with its slanted peripheral surface on the inclined inner circumferential surface of the crushing mantle.

13. A method for attaching a cone-shaped crushing mantle of a cone crusher to a carrier cone of the cone crusher and for detaching the crushing mantle from the carrier cone, the carrier cone having a carrier cone axis, the method comprising:

resting a pressure plate on a top surface of the crushing mantle, the pressure plate including a central opening and at least two through holes located around the central opening;

inserting an attachment screw into each of the through holes and screwing the attachment screws into a head region of the carrier cone, thereby pressing the crushing mantle against the carrier cone in an axial direction extending parallel in respect to the carrier cone axis;

pressing the crushing mantle against the carrier cone in a pre-tensioning process in the axial direction prior to tightening the screws in the head region of the carrier cone during attachment of the crushing mantle to the carrier cone and prior to loosening the screws in the head region of the carrier cone during detachment of the crushing mantle from the carrier cone, wherein the pressing is performed using a hydraulic pre-tensioning actuator including a pressure chamber and a piston limiting the pressure chamber, the pressing step including actuating the pre-tensioning actuator by providing a pressurized hydraulic medium into the pressure chamber, thereby increasing a volume of the pressure chamber and moving the piston such that the crushing mantle is pressed against the carrier cone, and tightening the attachment screws for attaching the crushing mantle to the carrier cone or loosening the attachment screws for detaching the crushing mantle from the carrier cone;

wherein during the pre-tensioning process, the hydraulic pre-tensioning actuator is applied externally to the pressure plate such that a piston rod of the piston or a rod-shaped element attached to the piston rod extends through the central opening of the pressure plate and is attached to the head region of the carrier cone, wherein the pressure chamber and the piston of the hydraulic pre-tensioning actuator are located on a side of the pressure plate opposite to the carrier cone; and wherein outside the pre-tensioning process, the hydraulic pre-tensioning actuator is released from the pressure plate.

14. The method according to claim 13, wherein the step of releasing the pre-tensioning apparatus from the pressure plate includes detaching the piston rod or the rod-shaped element attached to the piston rod from the head region of the carrier cone and pulling the piston rod or the rod-shaped element attached to the piston rod out of the central opening of the pressure plate.

15. The method according to claim 13, wherein the piston rod or the rod-shaped element attached to the piston rod includes an external thread and, before the pre-tensioning process, the external thread is screwed into a threaded hole provided in the head region of the carrier cone.

16. The method according to claim 13, further comprising outside the pre-tensioning process and after the hydraulic pre-tensioning actuator has been released from the pressure plate, installing a protective cap covering the pressure plate.

17. The method according to claim 16, wherein installing the protective cap comprises inserting fixing means of the protective cap into at least two other holes provided in the pressure plate thereby attaching the protective cap to the pressure plate.

18. The method according to claim 16, wherein installing the protective cap comprises inserting screws of the protective cap into at least two other threaded holes of the pressure plate thereby attaching the protective cap to the pressure plate.

19. The cone crusher for crushing mineral material, wherein the cone crusher comprises the cone-shaped crushing mantle and the carrier cone, wherein the crushing mantle is attached to the carrier cone by the method of claim 13.

* * * * *